United States Patent [19]

Onda et al.

[11] Patent Number: 4,469,426

[45] Date of Patent: Sep. 4, 1984

[54] CAMERA OF AUTOMATIC EXPOSURE CONTROL TYPE

[75] Inventors: Hiroki Onda; Yuichi Torikoshi, both of Hachioji, Japan

[73] Assignee: Olympus Optical Company Ltd., Tokyo, Japan

[21] Appl. No.: 338,160

[22] Filed: Jan. 8, 1982

[30] Foreign Application Priority Data

Feb. 10, 1981 [JP] Japan .............................. 56-17456[U]

[51] Int. Cl.³ ..................... G03B 7/081; G03B 17/02
[52] U.S. Cl. ................................... 354/447; 354/462; 354/288
[58] Field of Search .................. 354/23 R, 40, 45, 288

[56] References Cited

U.S. PATENT DOCUMENTS

| | | | |
|---|---|---|---|
| 3,106,882 | 10/1963 | Maitani | 354/47 |
| 4,240,735 | 12/1980 | Maitani et al. | 354/288 |
| 4,273,434 | 6/1981 | Maitani et al. | 354/288 |
| 4,299,465 | 11/1981 | Chan | 354/288 X |

FOREIGN PATENT DOCUMENTS 51-23728  2/1976  Japan.

Primary Examiner—Michael L. Gellner
Attorney, Agent, or Firm—Louis Weinstein

[57] ABSTRACT

A camera of the automatic exposure control type includes a protective cover which is movable between a closed position where it covers a taking lens and a photometric assembly and an open position where it permits them to be uncovered completely. The camera also includes an exposure control switch which is either opened or closed in ganged relationship with a movement of the protective cover to its open position, allowing an output from the photometric assembly to be supplied to an exposure controller.

5 Claims, 6 Drawing Figures

CAMERA OF AUTOMATIC EXPOSURE CONTROL TYPE

BACKGROUND OF THE INVENTION

The invention relates to a camera of the automatic exposure control type, and more particularly, to such a camera with an automatic exposure control interlocked with an exposure meter and including a protective cover which is movable between a closed position where it covers a taking lens, a photometric assembly and the like and an open position where it permits them to be exposed.

A camera with an automatic exposure control which is interlocked with an exposure meter is already known in which a photovoltaic element such as a selenium photocell is used as a photometric element to receive reflected light from an object being photographed and wherein the output of the element is utilized to produce a deflection of the pointer of an ammeter and the deflection or the angular position of the pointer is in turn detected by a cam member in order to control an exposure process. A conventional camera of the type described is adapted to have a lens cap mounted on the distal end of a taking lens barrel in order to protect the taking lens and photometric assembly from external dust, fingerprints and rubbing.

The lens cap is selectively located such that it is mounted on the lens barrel in a manner to cover the taking lens and photometric assembly completely or it is removed from the lens barrel to permit to taking lens and photometric assembly to be exposed completely. Consequently, there has been no possibility that the lens cap assumes a half-open position where it partly covers the taking lens or photometric assembly to cause a vignetting of the image field or a partial exposure. Hence, in a conventional camera of the type described, there is no need to lock a shutter release or to disable an exposure controller, which would be required if the lens cap assumed a half-open position. Accordingly, the photocell is maintained in electrical connection with the ammeter.

Another camera of the automatic exposure control type is also known in which the shutter release is locked whenever the exposure is improper, by utilizing a reduced or increased deflection of the pointer of the ammeter. In such a camera, in order to prevent the shutter from being operated when the lens cap is mounted on the lens barrel, the photocell is positively maintained in electrical connection with the ammeter so that the shutter release can be locked whenever the lens cap is mounted.

However, when the lens cap in such a camera is replaced by a protective cover movable between a closed position where it covers the taking lens and the photometric assembly and an open position where it permits them to be exposed, the protective cover may assume a half-open position where it permits the taking lens and the photometric assembly to be exposed partly in the course of moving from the closed to the open position. Consequently, a vignetting of the imaging field or a partial exposure may be caused by a shutter release which may happen to be triggered in the half-open position of the protective cover.

SUMMARY OF THE INVENTION

It is an object of the invention to provide a camera of the automatic exposure control type and including a protective cover and wherein an exposure control switch is provided so as to be opened or closed in ganged relationship with the movement of the protective cover so that an output from a photocell may be supplied to an exposure controller only when the protective cover has moved to it open position where it permits a taking lens and a photometric assembly to be uncovered completely.

In accordance with the invention, a vignetting of the image field or a partial exposure which may be caused by the use of a protective cover on a camera with an automatic exposure control which is ganged with an exposure meter is eliminated. In particular, when such a camera is provided with a mechanism which locks a shutter release, the vignetting of the image field or the partial exposure can be easily eliminated by utilizing the locking mechanism, without requiring any added components other than the exposure control switch.

DESCRIPTION OF PREFERRED EMBODIMENTS

Figure 1:
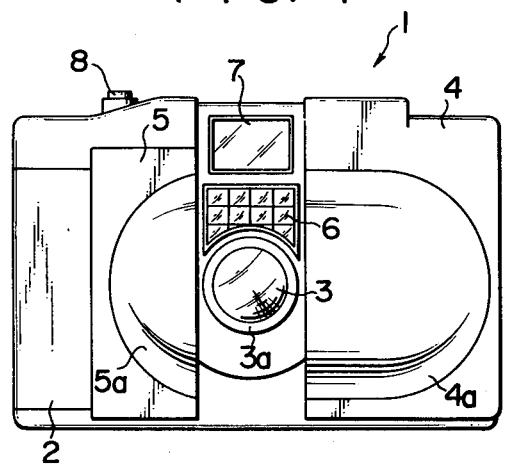
FIG. 1 is a front view of a camera of the automatic exposure control type according to one embodiment of the invention.

Referring to FIG. 1, there is shown a camera of the automatic exposure control type which is constructed according to one embodiment of the invention. The camera 1 includes a body 2, the front face of which is centrally provided with a taking lens 3. The camera includes a protective cover 4 which is movable between a first position in which it covers the taking lens 3 and a second position where it exposes the lens. The protective cover 4 includes a front wall which is disposed in opposing relationship with the front face of the body 2 in a region approximately corresponding to the right-hand half thereof so as to be slidable horizontally or to the left and right along the front face. The front wall is centrally formed with a semi-circular bulge 4a projecting forwardly in a semi-circular region extending from the left-hand end thereof to avoid its abutment against a lens barrel 3a for the taking lens 3 which slightly projects beyond the front face of the body 2 whenever the cover 4 is moved to its closed position where it covers the lens 3.

The body 2 is integrally provided with an abutment frame 5 which is located to the left of the taking lens 3 and which is abutted by the left-hand end face of the cover 4 whenever the latter has moved to its closed position. As shown, the abutment frame 5 is centrally formed with a semi-circular bulge 5a projecting forwardly in a region approximately corresponding to the left-hand half of a circle and extending from the right-hand end thereof. It is to be understood that the semi-circular bulges 5a and 4a form together a one-piece ellipsoidal body when the protective cover 4 assumes its closed position completely covering the taking lens 3.

It will be noted that the protective cover 4 is also adapted to cover a light receiving window 6 which is disposed directly above the lens 3 for the purpose of photometry as well as a finder window 7 which is located above the window 6 at the same time as it covers the taking lens 3. When the protective cover 4 moves to its open position where it completely uncovers the lens 3, the windows 6, 7 are also uncovered through the front face of the body 2. In FIG. 1, numeral 8 indicates a shutter release button.

Figure 2:
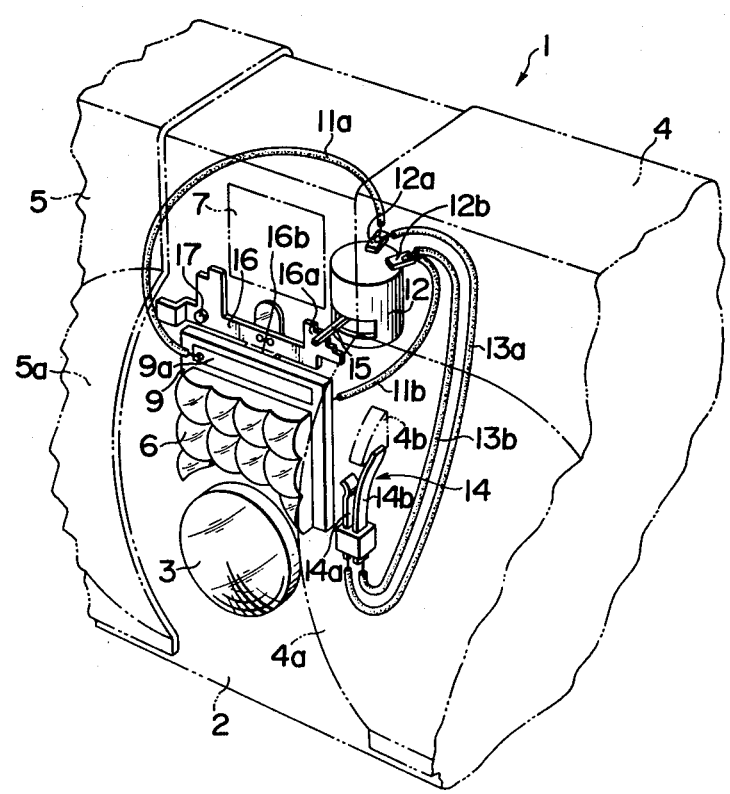
FIG. 2 is a fragmentary enlarged perspective view of internal components such as the photocell, exposure controller and exposure control switch which are disposed inside the camera shown in FIG. 1.

Referring to FIG. 2, the photometric, light receiving window 6 comprises a transparent condenser plate having a plurality of condensing fish-eye lenses formed on its front surface and having its rear surface adhesively secured to the light receiving surface of a selenium photocell substrate 9. The substrate 9 has a collector electrode 9a which is connected through a lead wire 11a to one input terminal 12a of an ammeter 12 which essentially comprises an exposure controller. The substrate 9 also includes a common electrode (not shown) which is connected through a lead wire 11b to the other input terminal 12b of the ammeter 12. The input terminals 12a, 12b of the ammeter 12 are in turn connected through lead wires 13a, 13b to terminals, each connected to one of a pair of movable blade contacts 14a, 14b of a normally closed exposure control switch 14. It will be noted that one of the blade contacts, 14b, of the switch 14 has a greater length than the other movable blade contact 14a, so that its free end is engageable with a switch actuating member 4b which is integrally mounted on the inner surface of the semi-circular bulge 4a of the protective cover 4. Accordingly, in the open position of the protective cover 4 where it is completely opened, the switch actuator member 4b presses against the free end of the blade contact 14b to open the switch 14. At other times, the resilience of the blade contact 14b causes the switch 14 to be closed.

Figure 6:
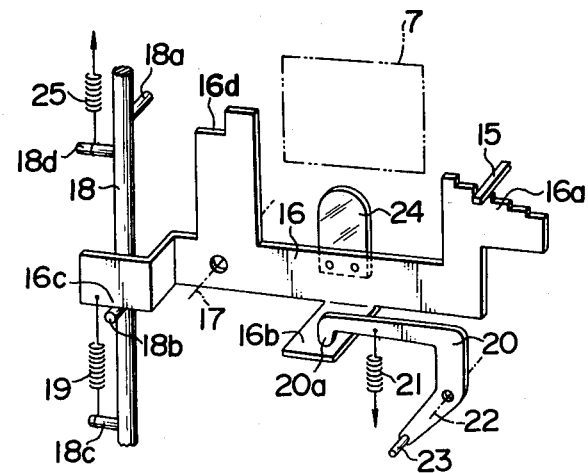
FIG. 6 is a fragmentary perspective view, illustrating a specific example of a mechanical arrangement used in the exposure controller shown in FIG. 2.

The ammeter 12 includes a pointer 15 which is arranged to project externally through an opening formed in the periphery of the ammeter so that its free end can be located in the region of a cam surface 16a of a cam member 16 which is provided for the purpose of controlling the exposure. The cam member 16 comprises a lever which is pivotally mounted on a pin 17. Referring to FIG. 6, it will be seen that the cam member includes an arm extending to the right, as viewed in this Figure, and the cam surface 16a is defined in the form of a series of offset steps which are formed on the upper edge of the arm adjacent to the free end thereof. A lateral extension 16b forwardly from the lower edge of this arm of the cam member 16 intermediate its length, and a diaphragm drive lever 20 is pivotally mounted on a pin 22. One arm of the lever 20 is engaged by a coiled tension spring 21, which urges the lever to rotate counter-clockwise about the pin 22. However, the resulting rotation of the lever is limited by the abutment of a depending portion 20a, formed by the end of this arm of the lever, against the lateral extension 16b from above. A drive pin 23 is fixedly mounted on the end of the other arm of the diaphragm drive lever 20 and is connected to diaphragm blades, not shown, so that the diaphragm blades defined a diaphragm aperture corresponding to the angular movement of the lever 20.

In the region of the pin 17, the cam member 16 has an upward extension, the left-hand half of the free end thereof is notched to define a detent 16d, which is effective to block the depression of a shutter release rod 18, to be described later, beyond a given position, by engagement with a detent pin 18a on the rod 18 whenever the cam member 16 is forced to rotate through an increased angle during an improper exposure. The other arm of the cam member 16 extends to the left and is then folded to extend forwardly before it is again folded to extend to the left. A portion 16c adjacent to the free end of this arm is adapted to engage a control pin 18b on the shutter release rod 18. A coiled tension spring 19 extends between the portion 16c and another pin 18c fixedly mounted on the shutter release rod 18, thus urging the cam member 16 to rotate counter-clockwise about the pin 17. However, the resulting rotation of the cam member 16 is limited by the abutment of the portion 16c against the control pin 18b. A transparent colored tag 24 is secured to the upper edge of the first mentioned or the right-hand arm of the cam member 16 intermediate its length so as to project upwardly, and is adapted to move into the sight of the finder to indicate an improper exposure to the user of the camera whenever the cam member 16 rotates through an increased angle during an improper exposure.

The shutter release rod 18 is disposed to be slidable in the vertical direction and is biased upward by the resilience of a coiled tension spring 25 having its one end anchored to a pin 18d fixedly mounted on the rod 18. The shutter release button 8 is fixedly mounted on the top end of the rod while the lower end thereof is connected to a shutter release mechanism, not shown, which is well known in itself.

The exposure controller which is provided with the shutter release locking mechanism shown in FIG. 6 is already well known in the art. The locking mechanism prevents a shutter release operation whenever the brightness of an object being photographed is extremely low or high, by causing the cam member 16 to move through an increased angle about the pin 17 as the shutter release rod 18 is depressed, without accompanying the abutment of the cam surface 16a against the pointer 15, until the detent 16d engages the detent pin 18a to prevent the downward movement of the shutter release rod 18 beyond a given position.

It is to be understood that an exposure period is established by a mechanism similar to the diaphram control mechanism mentioned above or by a manual operation.

Figure 3:
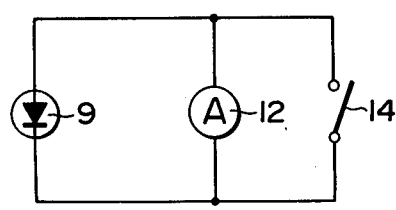
FIG. 3 is a circuit diagram of the electrical connection between the photocell, the exposure controller and the exposure control switch shown in FIG. 2.

FIG. 3 illustrates an electrical circuit formed by the substrate 9, the ammeter 12 and the exposure control switch 14. Specifically, the ammeter 12 and the switch 14 are connected in shunt with each other across the substrate 9. Consequently, whenever the switch 14 is closed, a photo-current produced by the substrate 9 flows through the switch 14 without operating the ammeter 12. Conversely, when the switch 14 is opened, the photocurrent flows through the ammeter 12 to operate it.

In operation, when the protective cover 4 is closed or assumes a half-open position, the switch actuator member 4b which is provided on the inner surface of the cover is remote from and thus is disengaged from the switch 14, which therefore remains closed. Accordingly, a photocurrent produced within the substrate 9 flows through the switch 14 without operating the ammeter 12. Hence, the pointer 15 remains stationary at its minimum deflection position. As a result, the depression of the shutter release button 8 fails to effect a shutter release since the shutter release locking mechanism interlocked with the cam member 16 is activated. In this manner, the likelihood of causing a vignetting of the image field or an improper exposure by the presence of the protective cover 4 is avoided.

When the protective cover 4 is completely open, the switch actuator member 4b engages the blade contact 14b to drive it out of contact with the other blade coontact 14a, whereby the switch 14 is opened. Consequently, the photocurrent produced within the substrate 9 flows through the ammeter 12, causing a deflection of the pointer 15 in accordance with the amount of light incident on the substrate 9 or the brightness of an object beingg photographed. Hence, the depression of the shutter release button 8 allows the cam member 16 to rotate counter-clockwise about the pin 17 until the cam surface 16a abuts against the pointer 15, thereby establishing a diaphragm aperture in accordance with the brightness of an object being photographed. In this manner, it is assured that a picture can be taken with a proper exposure.

Figure 4:
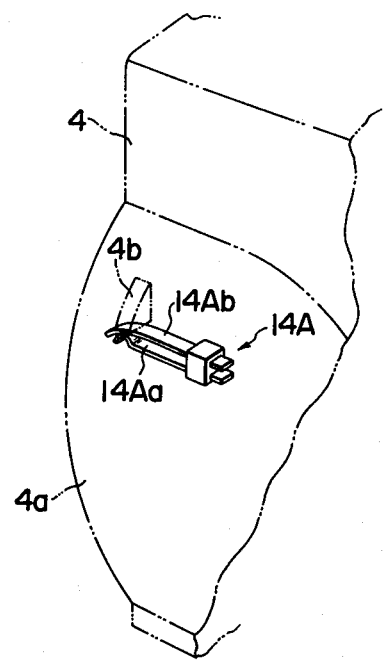
FIG. 4 is an enlarged perspective view of another form of exposure control switch shown in FIG. 2.
Figure 5:
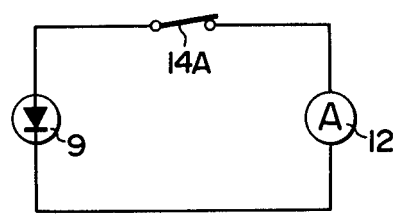
FIG. 5 is a circuit diagram illustrating the electrical connection of the exposure control switch shown in FIG. 4.

FIG. 4 illustrates another embodiment of the invention in which the normally closed switch 14 is replaced by a normally open switch in a camera similar to that shown in FIG. 2. Specifically, the normally open exposure control switch 14A includes a pair of blade contacts 14Aa and 14Ab, which are disposed in a horizontal position so that the free end of the blade contact 14Ab can be urged to be flexed downwardly upon engagement with the switch actuator member 4b which is provided on the inner surface of the protective cover 4. To assure a reliable engagement with the switch actuator member 4b, the free end of the blade contact 14Ab is configured to extend slightly downward. As shown in FIG. 5, the switch 14A is connected in series with the substrate 9 and the ammeter 12.

In other respects, the arrangement is similar to that illustrated in FIG. 2.

With this embodiment, when the protective cover 4 is closed or assumes a half-open position, the switch actuator member 4b is removed from the blade contacts, and hence the switch 14A remains open. Accordingly, there occurs no flow of a photocurrent produced within the substrate 9, preventing the ammeter 12 from being energized. Hence, the shutter release locking mechanism prevents a shutter release from being effected in response to the depression of the shutter release button 8. Accordingly, a vignetting of the image field or an improper exposure by the presence of the protective cover 4 is avoided.

However, when the protective cover 4 is completely open, the switch actuator member 4b closes the switch 14A. Thus, the photocurrent produced within the substrate 9 is allowed to flow through the switch 14A and the ammeter 12, causing a deflection of the pointer 15 in accordance with the brightness of an object being photographed. Thus, the depression of the shutter release button 8 establishes a diaphram aperture in accordance with the deflection of the pointer 15, thus achieving an automatic exposure control.

What is claimed is:

1. A camera of the automatic exposure control type, comprising:
    a protective cover freely movable in an unimpeded fashion between a closed position where it covers a taking lens and a photometric, light receiving assembly and an open position in which said taking lens and said photometric assembly are uncovered substantially simultaneously, said cover having a projection extending towards said camera body;
    an exposure controller responsive to an output from said photometric assembly and including movable means which is movable to one of a plurality of positions in response to the amount of light received by said photometric assembly;
    movable shutter control means actuated by a shutter button to cause said shutter control means to engage said movable means in one of said positions;
    an exposure control switch positioned on the external surface of said camera body and between said camera body and said movable cover are connected to said exposure controller and adapted to be actuated by the projection on the cover upon the movement of said protective cover to said open position thereby causing said photometric assembly to receive light and operate said exposure controller to cause said moveable means to move to one of said positions to be engaged by said shutter control means to control the camera exposures;
    said exposure control switch being covered by said movable cover regardless of the position of said movable cover; and
    said movable shutter control means including means for arresting movement of the shutter release button when said exposure controller moves said movable means to a position indicting the condition for a photographing operation is insufficient.

2. A camera of the automatic exposure control type, comprising:
    a unitary camera body;
    a protective cover freely movable in an unimpeded fashion relative to said camera body between a closed position, where it covers a taking lens and a photometric, light receiving assembly and an open position in which it permits them to be uncovered substantially simultaneously;
    said cover having an intergral projection extending toward said camera body;
    an exposure controller responsive to an output from the photometric assembly;
    an exposure control switch positioned on the exterior surface of said camera body between said camera body and said cover; and electrically connected to said exposure controller and having a switch arm positioned to be directly engaged by the projections on said cover and adapted to be in either opened or closed relationship with the movement of the protection cover from its closed position to its open position, where it permits the taking lens and the photometric assembly to be uncovered completely, thereby allowing an output from the photometric assembly to be supplied to the exposure controller;
    the position of said switch on the surface of camera body being chosen, so that the switch is completely covered by said movable cover regardless of whether said cover is opened or closed;
    said exposure controller comprising an ammeter connected to the photometric assembly and including a pointer and a cam member adapted to engage the pointer of the ammeter for controlling a diaphragm aperture or an exposure period, whereby the exposure controller operates automatically in interlocked relationship with an exposure value; and a shutter release locking mechanism, which blocks a depression of the shutter release button by allowing the cam member to rotate through an increased angle to lock the shutter release button whenever the deflection of the pointer of the ammeter has moved to a position indicating that the light condition is either excessively low or high.

3. A camera according to claim 2 in which the photometric assembly comprises a transparent condenser plate, and a photocell disposed on the rear side of the condenser plate.

4. A camera according to claim 2 in which the exposure control switch comprises a normally closed switch which is opened by a switch actuator member mounted on the protective cover whenever the latter is maintained in its open position, the switch being connected in shunt with the exposure controller across the photometric assembly.

5. A camera according to claim 2 in which the exposure control switch comprises a normally open switch which is closed by a switch actuator member mounted on the protective cover whenever the latter is maintained in its open position, the switch being connected in series with the photometric assembly and the exposure controller.

* * * * *

UNITED STATES PATENT AND TRADEMARK OFFICE
CERTIFICATE OF CORRECTION

PATENT NO. : 4,469,426

DATED : Sep. 4, 1984

INVENTOR(S) : Hiroki Onda and Yuichi Torikoshi

It is certified that error appears in the above-identified patent and that said Letters Patent is hereby corrected as shown below:

Column 2, line 6 change "it" to --its--.
Column 3, line 57 after "16b" insert --extends--.
Column 5, line 11 change "coon-" to --con- --.
Column 5, line 17 change "beingg" to --being--.

Signed and Sealed this

Twenty-second Day of January 1985

[SEAL]

Attest:

DONALD J. QUIGG

Attesting Officer       Acting Commissioner of Patents and Trademarks